US005664130A

United States Patent [19]

Griffiths

[11] Patent Number: 5,664,130

[45] Date of Patent: Sep. 2, 1997

[54] WINDOWING DISPLAY SYSTEM

[75] Inventor: Edward Griffiths, Southampton, England

[73] Assignee: International Business Machines Corporation, Armonk, N.Y.

[21] Appl. No.: 544,358

[22] Filed: Oct. 17, 1995

Related U.S. Application Data

[63] Continuation of Ser. No. 77,907, Jun. 15, 1993, abandoned.

[30] Foreign Application Priority Data

Jun. 19, 1992 [EP] European Pat. Off. .............. 92305669

[51] Int. Cl.[6] .............. G06F 3/14

[52] U.S. Cl. .............. 345/340; 345/346

[58] Field of Search .............. 395/340, 341, 395/342, 343, 344, 345, 346, 347, 326; 345/55, 72, 76, 83, 60

[56] References Cited

U.S. PATENT DOCUMENTS

| | | | |
|---|---|---|---|
| 4,550,315 | 10/1985 | Bass et al. | 345/199 |
| 5,025,249 | 6/1991 | Seiler et al. | 345/119 |
| 5,038,300 | 8/1991 | Seiler et al. | 395/131 |
| 5,058,041 | 10/1991 | Rose et al. | 395/164 |
| 5,142,615 | 8/1992 | Levesque et al. | 395/131 |

FOREIGN PATENT DOCUMENTS

| | | |
|---|---|---|
| 0210423 | 2/1987 | European Pat. Off. . |
| 0482746 | 4/1992 | European Pat. Off. . |
| 9207349 | 4/1992 | WIPO . |

OTHER PUBLICATIONS

IBM TDB, "Mapping Multiple Images to One Custom Color Palette", vol. 30, No. 12, May 1988, pp. 5–6.

*Primary Examiner*—Thomas G. Black
*Assistant Examiner*—Ruay Lian Ho
*Attorney, Agent, or Firm*—Thomas E. Tyson; Andrew J. Dillon

[57] ABSTRACT

A method and system for generating a private colormap for a window in a data processing system having a shared colormap. A private colormap is generated by overwriting a selected portion of a copy of the shared colormap with a user-determined colormap of the same size as the selected portion to form a modified colormap. The modified colormap is then substituted in place of the shared colormap.

20 Claims, 2 Drawing Sheets

WINDOWING DISPLAY SYSTEM

This is a division, of application Ser. No. 08/077,907, filed 15 Jun. 1993, now abandoned.

TECHNICAL FIELD

The invention relates to windowing display systems and, more particularly, to the generation of colormaps therein.

BACKGROUND ART

Windowing display systems having storage locations for storing a colormap (or colourmap or color lookup table) which determines the colors displayed in the system corresponding to particular pixel values are known. These include means for generating a shared colormap by assigning screen colors to pixel values dynamically as the screen colors are required by tasks using the system, and which allow at least some of the windows to have a private colormap which can be copied into the storage locations when the corresponding window is activated. One example of a system of the above type is the X-Windows system (X-Windows is a trademark of the Massachusetts Institute of Technology).

A major problem which occurs in this type of system in a graphics workstation which provides storage locations sufficient to store only one hardware colormap is known as 'flashing'. The system allows each window the flexibility of having its own private colormap, but the display hardware allows only one colormap to be installed at any one time. A colormap corresponding to each window must be copied into the hardware colormap each time the window is activated, usually when the display cursor is brought into the bounds of the window. If a private colormap for a window is used the colors of other windows in the system will change when it is activated. This interference between the colors of the windows is very annoying for the user.

To avoid 'flashing' (i.e. the colors used in the windows constantly changing as each window becomes active and installs its own colormap), the system provides a shared colormap common to all the windows in the system which can be used by any window by copying the shared colormap into the hardware colormap when the window is activated. The pixel value to displayed-color mapping in this shared colormap is dynamically determined by the system as particular displayed colors are acquired or released by tasks using the system.

This shared colormap arrangement works as long as the windows do not require the colors to be allocated to specific predefined values in the colormap. However, some tasks in such a display system, such as the presentation of images, do require a unique mapping between pixel values and displayed color. If the shared colormap is used for this purpose the image must be remapped before display so that the image pixel values correspond with the values assigned to the required colors in the dynamically generated shared colormap. This remapping can be a relatively time consuming process, often taking of the order of several seconds for a high resolution image. On the other hand, if a private colormap is used just for the image then the color of all the other windows on the display will change when the image window is activated.

The user of such a display system is thus caught in a cleft stick. That is, if they don't want the colors of other windows to change when the image window is activated, then the image display is slow because of the remapping. If they want fast image display, they cannot use the shared colormap and will get 'flashing'.

DISCLOSURE OF THE INVENTION

To solve this problem, the present invention provides a method of generating a private colormap for a window in a display system of the above type, the method being characterized by the steps of overwriting a selected portion of a copy of the shared colormap, with a user-determined colormap of the same size as the selected portion to form a modified colormap, and copying the modified colormap into an area of storage assigned to the private colormap for the window.

The invention is based on two observations. First, usually only a small proportion of the total available color cells in the shared colormap are actually used by other tasks using the system. This is because windows use so many colors in common, e.g. for borders, buttons and text etc. Second, the shared colormap is not filled randomly. Thus at any time there will usually be a substantial and predictable portion of the shared colormap free. A portion of a copy of the shared colormap can thus be overwritten with a user-determined colormap which can be used for image display. The user can range their images in advance to lie in the range of pixel values set by them in this colormap and will obtain fast image display with no interference with the colors used in other windows.

Preferably, the selected portion is the portion of the shared colormap which would be filled last in generation of the shared colormap by the system. The portion is thus selected in such a way that it is known that there is unlikely to be any overlap with the pixel values used by other tasks. For example, in a display system in which the shared colormap is generated by assigning to a newly required color the nearest available pixel value to one end of a range of pixel values, the selected portion can end at the other end of the range. In systems such as X-Windows which fill the shared colormap from the bottom in this way, choosing the top portion of the colormap for the overwrite colormap ensures that it is very unlikely that the existing window colors and the overwritten colors will overlap.

However, even if there is some overlap, only a few colors in the surrounding windows will be affected when the image window is activated. The performance of the system only degrades gradually as the size of the overwritten colormap increases, since a greater degree of overlap between existing window colors and the overwrite colormap leads to other windows being changed to a greater extent while the image continues to be displayed correctly.

The size of the user-determined colormap can be a substantial proportion of the size of the shared colormap, so that it is sufficiently large to be of use in image display, but so that it is still unlikely that the existing window colors and the overwritten colors will overlap.

The invention also provides a method of activating a window in windowing display system of the above type comprising generating a private colormap for the window using such a method and copying the generated private colormap into the storage locations.

In one embodiment of the invention this method is used only on first activation (i.e. creation) of a window, the same modified colormap being copied into the storage locations on subsequent activation of the window. Accordingly, the invention provides a method of creating a window in a windowing display system of the above type, the method including activating the window using the above described method and a method of operating such a windowing display system, the method including thus creating a window and then copying the generated private colormap into the storage locations each time the window is subsequently activated.

Viewed from another aspect, the invention provides an image processor for use with a windowing display system of the above type, the image processor comprising logic for assigning an area of storage in a storage device to a window in the display system, and characterized by logic for (a) copying the shared colormap of the display system into the area of storage, (b) overwriting a selected portion of the copy of the shared colormap with a user-determined colormap of the same size as the selected portion to form a modified colormap, and (c) copying the modified colormap into an area of storage in the display system assigned to a private colormap for the window.

In one embodiment the image processor takes the form of an image display widget designed for use as part of a client program to interface with an X-Windows server program running on a graphics workstation. The invention also provides a windowing display system including such an image processor.

An embodiment of the invention will now be described, by way of example only, with reference to the accompanying drawing.

BEST MODE FOR CARRYING OUT THE INVENTION

Figure 1:
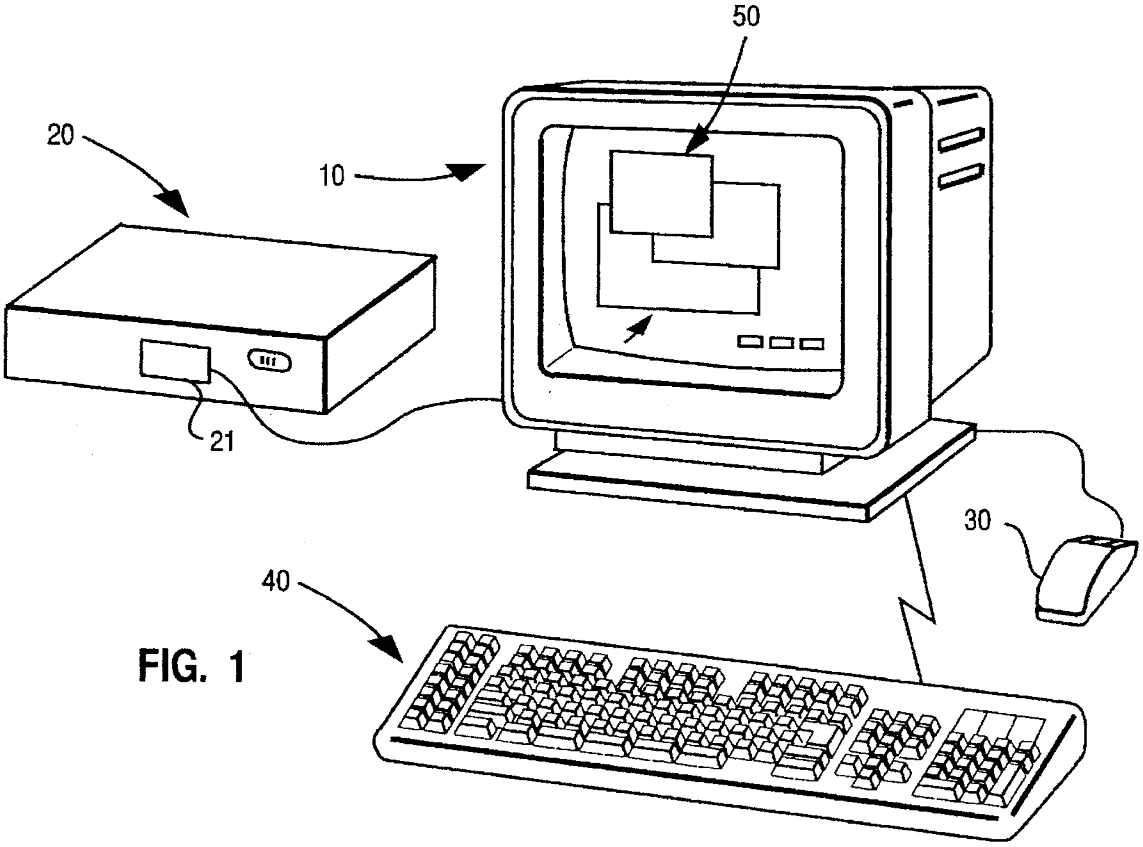
FIG. 1 shows a display system according to the invention.

Referring to FIG. 1 there is shown a windowing display system comprising display device 10, system unit 20, mouse 30 and keyboard 40. A user interacts with the system via windows 50 displayed on the display device 10. System unit 20 includes display adapter 21 in which is stored a hardware colormap which determines the colors displayed on display device 10 corresponding to particular pixel values supplied to the display adapter by an application running on the system.

Figure 2:
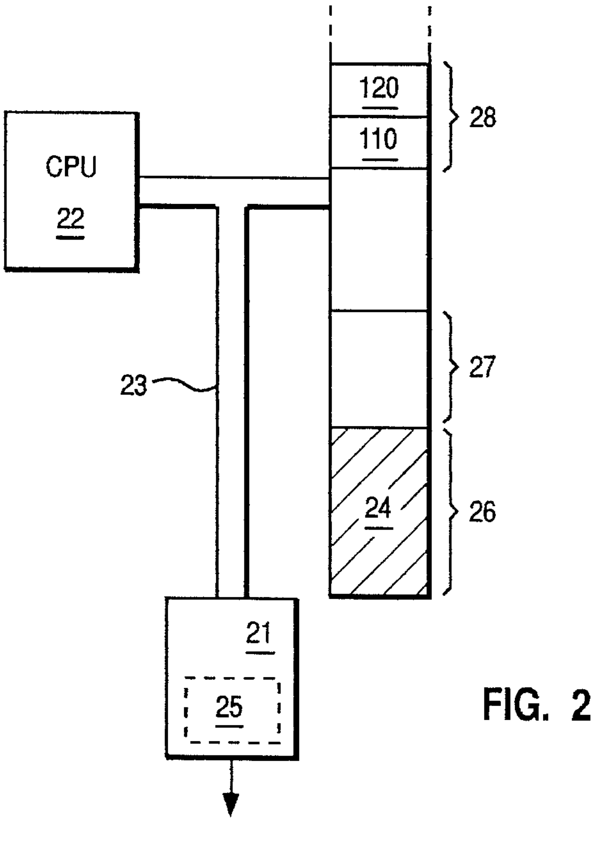
FIG. 2 is a schematic diagram showing parts of the system unit in the embodiment of the invention.

FIG. 2 is a schematic diagram showing parts of system unit 20. CPU 22 is connected via bus 23 with Random Access Memory (RAM) 24 and display adapter 21. Display adapter 21 includes storage locations 25 for storing the hardware colormap. RAM 24 has areas 26 and 27 respectively reserved for the shared colormap and a private colormap for an application running on the system. The system generates, in a manner well known in the art, shared colormap 26, which can be used by a number of different applications, by assigning screen colors to pixel values dynamically in response to a request for a particular color from an application.

Figure 3:
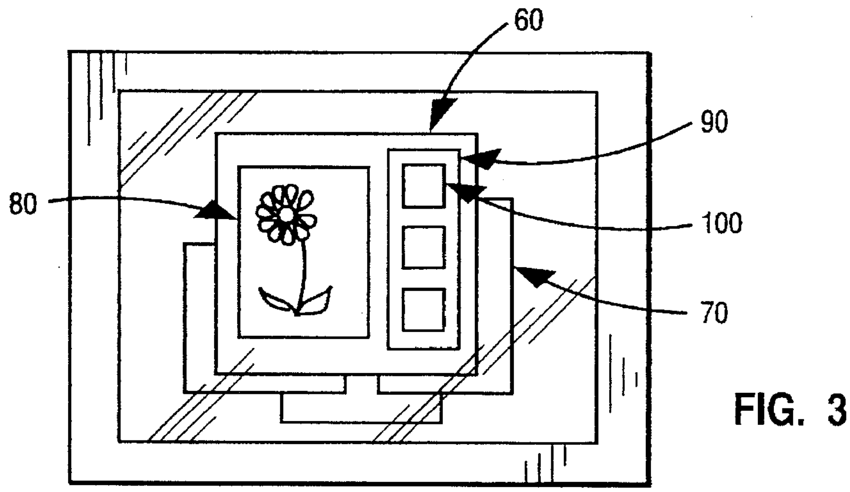
FIG. 3 shows a view of the display screen in use.

FIG. 3 shows a typical view of the display device screen in use. It shows a window 60 corresponding to one application and other windows 70 corresponding to other applications running on the system. Window 60 includes a number of other windows, image window 80 and control panel window 90, all of which are associated with the same application. Control panel window 90 includes button windows 100, by means of which the user can interact with the application in a manner well known in the art.

In this embodiment, the system is set up so that a window is activated whenever the display cursor moves onto an area of the display on which the window is visible. It will be understood that there are many other ways in which activation of a window could be initiated, such as execution of an instruction in an application or by a specific action, like the pressing of a mouse button, performed by a user. Activation, as used herein, means any process which requires a colormap corresponding to a window to be installed in the hardware colormap.

In the system, when a window associated with an application is activated, the application can either copy a private colormap corresponding to the window into the hardware colormap or can elect to use the shared colormap 26, which is common to all the windows in the system. If the private colormap is used then when another window in the system is activated, the colors of the window will change as the color map the newly activated window is using is copied into the hardware colormap. If the shared colormap 26 is used, then the application is constrained to make use of the color value to pixel value mapping therein, which cannot be determined in advance.

Figure 5:
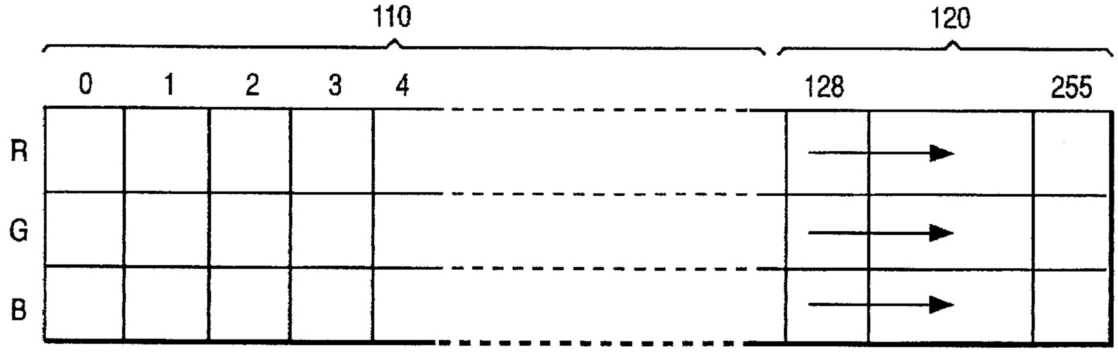
FIG. 5 is a schematic diagram showing a private colormap generated using the method of the present invention.
Figure 4:
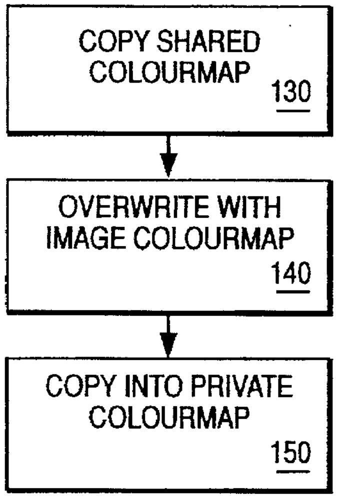
FIG. 4 is a flow diagram showing the main steps of the method of the invention.

On creation of an image window, such as window 80, the steps shown in FIG. 4 are performed under program control by the CPU 22. The shared colormap (also referred to as a colourmap) is copied 130 into an area of storage 28 reserved for the task. This copy of the shared colormap is then overwritten 140 as shown in FIG. 5. The lower part of the map 110 includes the pixel values which have been assigned to colors by the system. The upper part 120 of the map is overwritten by a user-determined colormap for use in displaying image 80. For example, in this embodiment, which uses 1 byte/pixel windows and 256-entry colormaps, the upper part 120 can stretch from pixel values 128 to 255 and the lower part from pixel values 0 to 127. This modified copy is then copied 150 into the private colormap 27 and into the hardware colormap 25 in display adapter 21.

It will be understood, of course, that the term user as used herein can include the application using the display system and the programmer of such an application.

In this embodiment of the invention the modified private colormap is only generated when the image window is created (i.e. when the window is first activated), the same modified private colormap being copied into the hardware colormap on subsequent activation of the window. However, it will be understood that the system could equally be arranged to execute all the above steps every time the window is activated or each time the shared colormap is changed by another task so that the private colormap is kept up to date.

Color value assignments in the lower part of the hardware colormap will be common to other applications running on the system which are using the shared colormap and colors in the upper part of the hardware colormap will be assigned to pixel values in a predetermined way for use by the application.

Figure 6:
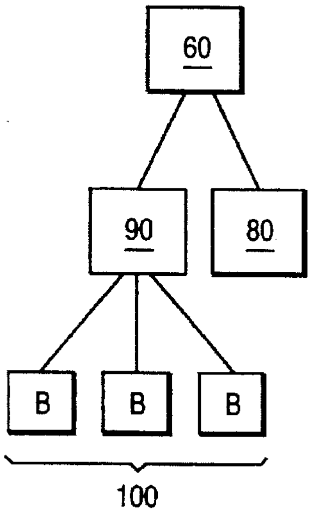
FIG. 6 is a diagram illustrating a window hierarchy.

As is common in windowing display systems, the windows are arranged in a hierarchy as shown in FIG. 6. Image window 80 and control panel window 90 are children of the background window 60. Button windows 100 are children of control panel window 90. Background window 60 itself is a child of the root window, which is the top window in the display system.

In this case, a single image processing application controls background window 60 and all its children. The private colormap is associated with the background window 60 causing it to be used whenever any of the child windows of background window 60 are activated. This ensures that no colors are changed on the screen whenever the cursor moves between windows 60, 80, 90 or 100. If the cursor moves outside of window 60 only the colors of the image window 80 will change.

In this embodiment of the invention the method is carried out using an appropriate computer program running on a general purpose graphics workstation. The program takes the form of an image display widget which is part of a graphics software toolkit package designed to interface application programs to such a workstation. In this particular example it is designed for use as part of a client program to interface with the X-Windows server program, which provides all the function necessary to generate the screen image, including management of the windows and the colormaps, on the display device. An standard X-windows style interface is provided which allows each application to specify a colormap of any length up to the length of the X-Windows colormap and also to specify where that colormap should be placed in the private copy of the X-Windows shared colormap.

While for the purposes of clarity in this embodiment the client program and the server program have been described running on a single graphics workstation, it will be understood that the client program does not necessarily have to run on the same workstation as the X-windows server program. The server program can run on a graphics workstation on which the screen images are actually displayed, while the client can run on another computer which is connected to the graphics workstation via an appropriate data communications network.

It should further be noted that the invention could be implemented in hardware, for example as a hardware feature of such a workstation, or indeed could be implemented as any combination of hardware and software.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. A method of generating an image having a plurality of windows on an output display device comprising the steps of:

generating in a memory area a shared colormap including colors used by all of said plurality of windows; said shared colormap including a more-used part and a lesser-used part;

overwriting in said memory area a selected portion of said shared colormap when a first window of said plurality of windows is activated; said selected portion being in said lesser-used part; and utilizing the overwritten colormap from said area of said memory to display the first window and at least a portion of all others of said plurality of windows on the output display device.

2. The method of claim 1 further comprising the steps of:

storing the overwritten colormap in memory; and retrieving the overwritten colormap from memory for use in the step of utilizing when the first window is subsequently reactivated.

3. The method of claim 2 further comprising the steps of:

overwriting the selected portion of said overwritten colormap when a second window is activated, thereby generating a newly overwritten colormap; and utilizing the newly overwritten colormap to display the second window and at least a portion of said plurality of windows on the output device.

4. The method of claim 2 wherein the step of generating includes filling the selected portion of the shared colormap last during generation of the shared colormap.

5. The method of claim 4 wherein the step of generating includes assigning to a newly required color in the shared colormap a nearest available pixel value to one end of a range of pixel values, wherein the selected portion ends at another end of the range.

6. An apparatus for generating an image having a plurality of windows on an output display device comprising:

means for generating in a memory area a shared colormap including colors used by all of said plurality of windows; said shared colormap including a more-used part and a lesser-used part;

means for overwriting in said memory area a selected portion of said shared colormap when a first window of said plurality of windows is activated; said selected portion being in said lesser-used part; and means for utilizing the overwritten colormap from said area of said memory to display the first window and at least a portion of all others of said plurality of windows on the output display device.

7. The apparatus of claim 6 further comprising:

means for storing the overwritten colormap in memory; and means for retrieving the overwritten colormap from memory for use by the means for utilizing when the first window is subsequently reactivated.

8. The apparatus of claim 7 further comprising:

means for overwriting the selected portion of said overwritten colormap when a second window is activated, thereby generating a newly overwritten colormap; and means for utilizing the newly overwritten colormap to display the second window and at least a portion of said plurality of windows on the output device.

9. The apparatus of claim 7 wherein the means for generating includes means for filling the selected portion of the shared colormap last during generation of the shared colormap.

10. The apparatus of claim 9 wherein the means for generating includes means for assigning to a newly required color in the shared colormap a nearest available pixel value to one end of a range of pixel values, wherein the selected portion ends at another end of the range.

11. A data processing system comprising:

an output device for displaying images;

memory for storing data;

means for generating an image having a plurality of windows on the output device, said means for generating an image including:

means for generating in said memory a shared colormap including colors used by each of said plurality of windows;

means for overwriting in said memory a selected portion of said shared colormap when a first window of said plurality of windows is activated; said selected portion being in a least-used part of said colormap; and means for utilizing the overwritten colormap from said memory to display the first window and at least a portion of said plurality of windows on the output device.

12. The data processing system of claim 11 further comprising:

means for storing the overwritten colormap in memory; and means for retrieving the overwritten colormap from memory for use by the means for utilizing when the first window is subsequently reactivated.

13. The data processing system of claim 12 further comprising:

means for overwriting the selected portion of said overwritten colormap when a second window is activated, thereby generating a newly overwritten colormap; and means for utilizing the newly overwritten colormap to display the second window and at least a portion of said plurality of windows on the output device.

14. The data processing system of claim 12 wherein the means for generating includes means for filling the selected portion of the shared colormap last during generation of the shared colormap.

15. The data processing system of claim 14 wherein the means for generating includes means for assigning to a newly required color in the shared colormap a nearest available pixel value to one end of a range of pixel values, wherein the selected portion ends at another end of the range.

16. A data processing system for displaying multiple windows, said data processing system comprising:

a display device for displaying said multiple windows;

a memory area for storing colormap information for said display device;

a single hardware colormap stored in said memory area for providing said multiple windows with color on said display device; said single colormap including a more-used part and a lesser-used part;

means for overwriting in said memory area a selected portion of said colormap when a first one of said multiple windows is activated; said portion being in said lesser-used part; and means for using said overwritten colormap from said memory area for providing said first one of said multiple windows and at least a portion of said other multiple windows with color on said display device.

17. The data processing system of claim 16 wherein said means for overwriting said selected portion of said colormap includes:

memory for storing a copy of said colormap; and means for overwriting a selected portion of said copy of said colormap in said memory.

18. The data processing system of claim 17 wherein said means for using includes:

means for substituting said colormap with said overwritten colormap.

19. The data processing system of claim 16 wherein said means for overwriting a selected portion includes:

means for overwriting said selected portion of said substituted colormap when a second one of said multiple windows is activated.

20. The data processing system of claim 19 wherein said means for using said overwritten colormap includes:

means for using said overwritten substitute colormap for providing said second one of said multiple windows and at least a portion of said other multiple windows with color on said display device.

* * * * *